Patented Aug. 29, 1950

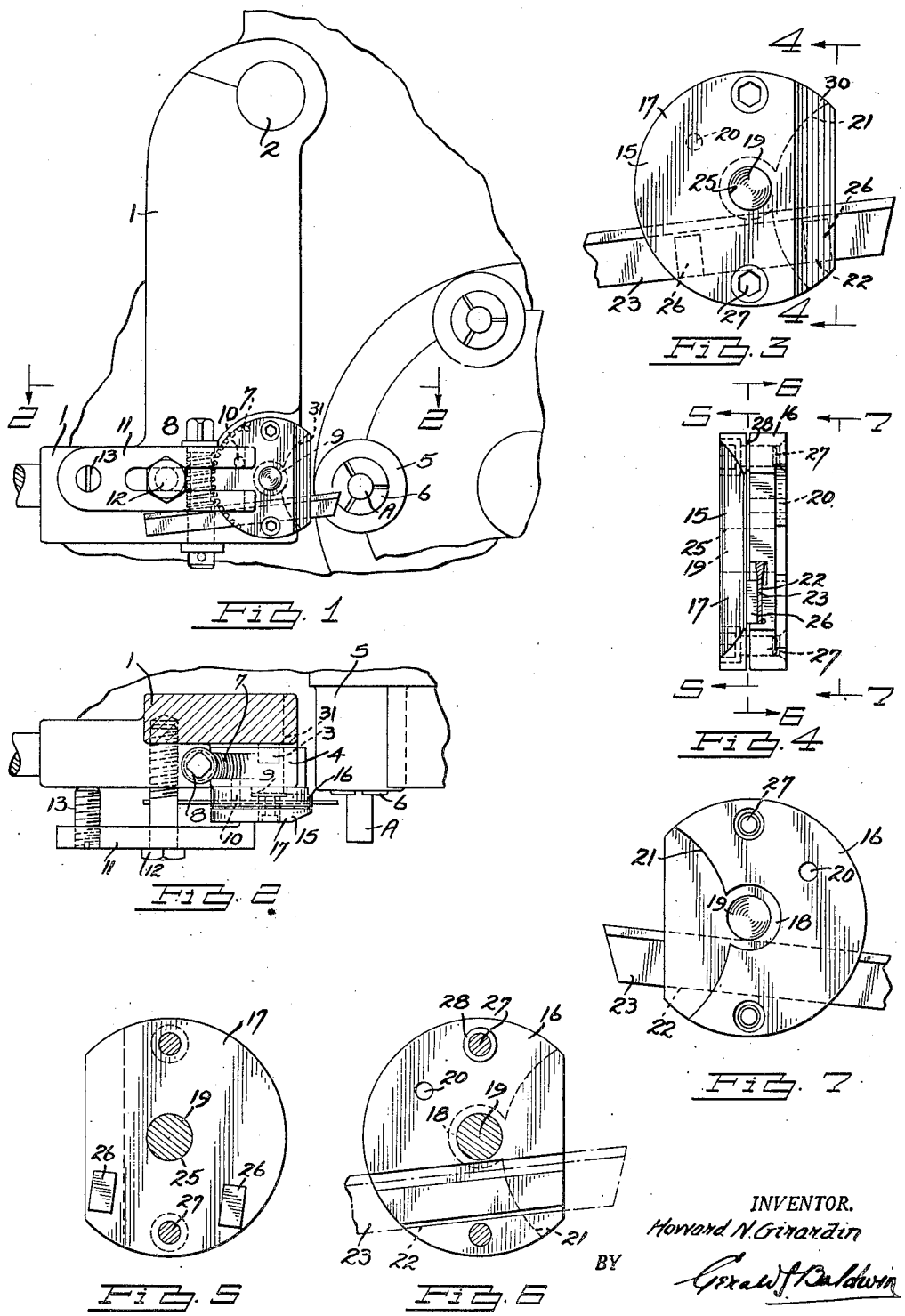

2,520,205

UNITED STATES PATENT OFFICE 2,520,205

TOOLHOLDER

Howard N. Girardin, Grosse Pointe Farms, Mich., assignor to John Milton Luers Patents Incorporated, Mount Clemens, Mich., a company of Michigan Application November 2, 1946, Serial No. 707,349

1 Claim. (Cl. 29—98)

This invention relates to improvements in toolholders. It is an object of the invention to provide a toolholder for use on a well known type of automatic machine having a carrier plate mounted for rotary adjustment on which a tool or holder may be secured by a U-clamp upon the machine.

Another object of the invention is to provide a toolholder including two plates one of which is mounted on the carrier plate and has a tool receiving slot formed across its outer face, and the other plate has spaced projections thereon to engage a tool in the slot when it is forced against the first plate; moreover the arrangement contemplates the utilization of a clamp upon the machine for securely holding both plates against the rotary plate and thereby forcing the spaced projections into firm engagement with the tool so that the latter is rigidly supported.

A further object of the invention is to provide a toolholder including two plates one of which is slotted across its face to receive a tool against which pressure is laterally exerted by spaced projections on the adjacent face of the other plate, and to provide means for maintaining the plates somewhat spaced from one another at all times, since after removal of one tool another may far more readily be inserted through its slot if the plates are spaced and have not moved into contact with one another.

Having thus briefly stated some of the objects and advantages of the invention I will now describe it with the aid of the accompanying drawing, in which:

Figure 1 is a front view of a portion of an automatic machine on which my toolholder is mounted.

Figure 2 is a section on the line 2—2 of Figure 1.

Figure 3 is a front elevation of the toolholder, and

Figure 4 is an end view taken on the line 4—4 of Figure 3.

Figure 5 is a view of the front plate taken as a section on the line 5—5 of Figure 4.

Figure 6 is a view of the rear plate taken as a section on the line 6—6 of Figure 4.

Figure 7 is a rear view of the rear plate taken on the line 7—7 of Figure 4.

I will first describe some of the parts of the well known type of automatic machine upon which my toolholder is employed. Referring to the drawing, 1 designates a swinging tool arm mounted for pivot movement on a trunnion 2; and projecting forwardly from the said arm is a pin 3 on which a carrier plate 4 is rotatably supported. Rotatably mounted parallel with the pin 3 is a spindle 5 having a collet 6 thereon by which a workpiece A is held. In order that the carrier plate 4 may be moved closer to the workpiece a portion of one side of the plate and also a portion of the tool arm 1 are cut away as indicated at 31 to clear the spindle 5.

The major portion of the periphery of the carrier plate 4 is arcuate, and formed around a portion of its arcuate periphery are teeth 7; rotatably supported in the tool arm 1 is a worm 8 which meshes with the teeth 7 so that upon rotation of the worm the carrier plate is turned. The latter is provided with a coaxial pin 9 which projects forwardly therefrom and also a forwardly extending dowel 10, both to engage a tool or holder which is retained against the said plate by a U-clamp 11. Through the slot in the latter a screw 12 extends which is in threaded engagement with the tool arm 1, and the head of the screw exerts inward pressure against the clamp. In threaded engagement with the end of the clamp remote from its tool or holder engaging extremity is a set screw 13 which exerts pressure against the tool arm and retains the slotted end of the clamp in binding engagement with the tool or holder on the carrier plate.

My toolholder 15 includes a front plate 17 and a rear plate 16. Formed in the rear side of the latter is a central recess 18 to receive the pin 8, and projecting forwardly from the said rear plate coaxially with the recess 18 is a locating pin 19; an opening 20 is also formed through the plate 16 to receive the dowel 9. The rear portion of one side of the rear plate 16 is cut away at 21 to permit movement of the said plate closer to the axis of the spindle 5, and formed across the front face of the plate is a non-radial slot 22 to receive a tool 23 for longitudinal movement therethrough. One margin of the slot 22 is of increased depth to receive one side of a head of greater thickness formed along one side of the tool.

The front plate 17 is centrally apertured at 25 to receive the locating pin 19, and provided on its inner face are two relatively narrow, spaced projections 26 which exert pressure laterally against the tool 23 beneath its head 24 and hold the said tool immovable in its slot. Screws 27 extending through the front plate 17 and in threaded engagement with the rear plate 16 hold the two plates substantially together, though mounted around one of the screws 27 between the plates is a washer 28 of less thickness than the projections 26. This washer maintains some spacing at all times between the plates so that after a tool has been removed they cannot come completely together, for should they do so it is considerably more difficult to insert a tool between them. While the tool is to some extent held by the screws 27, the clamp 11 bearing against the front plate 17 exerts materially greater pressure against the latter and it is by the clamp rather than by the screws that the tool is held immovable. The clamp of course also retains the toolholder 15 against the carrier plate 4.

It will also be noted that one edge of both plates 16 and 17 is flat to permit them to move nearer to the axis of the work A, and toward its flat edge the front face of the front plate 17 is rearwardly bevelled at 30 to provide chip clearance.

While in the foregoing the preferred embodiment of the invention has been described and shown it is understood that alterations and modifications may be made thereto provided they fall within the scope of the appended claim.

What I claim is:

A toolholder including a front and a back plate both of which are flat and of substantially circular contour, said plates being axially apertured, the aperture in the back plate being adapted to receive a pin projecting from a fixed tool arm on a machine to support the plate for rotary adjustment, means extending through both apertures for retaining said plates coaxial, the inner face of one plate having a non-radial slot formed across it to receive a tool blade one extremity of which projects beyond said plates at right angles to their axis, spaced projections on the inner face of the other plate to bear against the blade, fastening means for holding both plates together, and a clamp mounted on the machine to exert pressure against the front plate for holding said plates firmly together and the back plate against the tool arm so that the blade is held immovable between said plates, said clamp also holding the back plate immovable about the pin.

HOWARD N. GIRARDIN.

REFERENCES CITED

The following references are of record in the file of this patent:

UNITED STATES PATENTS

| Number | Name | Date |
|---|---|---|
| 858,440 | Chapman | July 2, 1907 |
| 966,755 | Kuhn | Aug. 9, 1910 |
| 1,200,416 | Drafer | Oct. 3, 1916 |
| 1,327,561 | Johnson | Jan. 6, 1920 |
| 1,684,667 | Frenette | Sept. 18, 1928 |